(12) United States Patent
Nahill et al.

(10) Patent No.: US 8,590,789 B2
(45) Date of Patent: Nov. 26, 2013

(54) SCANNER WITH WAKE-UP MODE

(75) Inventors: James Nahill, Turnersville, NJ (US); David Wilz, Sewell, NJ (US); Thomas Amundsen, Turnersville, NJ (US); Dwight Franz, Haddonfield, NJ (US); Mark Hernandez, Bridgeton, NJ (US); Shane Michael Edmonds, Monroeville, NJ (US); Sarah Gloeckner, Mount Royal, NJ (US); John Beiler, Lancaster, PA (US); Mark Meagher, Woodbury, NJ (US); James A. Cairns, Victor, NY (US); Glenn Alan Cavanaugh, New Egypt, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 13/232,081

(22) Filed: Sep. 14, 2011

(65) Prior Publication Data

US 2013/0062409 A1    Mar. 14, 2013

(51) Int. Cl.
*G06K 15/00* (2006.01)
*G06K 7/00* (2006.01)
*G06F 17/00* (2006.01)
*G06Q 40/00* (2012.01)
*G07D 11/00* (2006.01)
*G07F 19/00* (2006.01)

(52) U.S. Cl.
USPC ........... 235/439; 235/375; 235/383; 235/379; 235/378

(58) Field of Classification Search
USPC .................. 235/375, 378, 379, 383, 439
See application file for complete search history.

(56) References Cited

U.S. PATENT DOCUMENTS

| | | | |
|---|---|---|---|
| 3,219,148 A | 11/1965 | Stern | |
| 3,714,890 A | 2/1973 | Moon | |
| 3,717,091 A | 2/1973 | Moon | |
| 3,722,404 A | 3/1973 | Moon | |
| 3,732,805 A | 5/1973 | Moon | |
| 4,071,740 A * | 1/1978 | Gogulski | 235/431 |
| 4,736,098 A * | 4/1988 | Rehrig | 250/222.1 |
| 4,988,851 A * | 1/1991 | Kohno et al. | 186/61 |
| 5,280,162 A * | 1/1994 | Marwin | 235/462.31 |
| 5,485,006 A * | 1/1996 | Allen et al. | 250/222.1 |
| 5,495,102 A * | 2/1996 | Fine | 250/222.1 |
| 5,895,908 A * | 4/1999 | Kawai et al. | 235/462.3 |
| 6,201,473 B1 * | 3/2001 | Schaffer | 340/568.5 |

(Continued)

FOREIGN PATENT DOCUMENTS

EP        548451 A2 *  6/1993

OTHER PUBLICATIONS

U.S. Appl. No. 13/371,147, filed Feb. 10, 2012.
U.S. Appl. No. 13/371,125, filed Feb. 10, 2012.

(Continued)

*Primary Examiner* — Daniel Walsh
(74) *Attorney, Agent, or Firm* — Additon, Higgins, Pendleton & Ashe, P.A.

(57) ABSTRACT

An indicia reader system includes an indicia reader provided at a point of transaction; a controller for controlling power to the indicia reader; a detector for detecting a customer, item or shopping cart at the point of transaction and providing an indication signal to the controller of the presence of customer, item or shopping cart at the point of transaction; wherein the controller interrupts power to the indicia reader during a power save mode and resumes power to the indicia reader upon receiving the indication signal.

9 Claims, 3 Drawing Sheets

(56) References Cited

U.S. PATENT DOCUMENTS

| | | |
|---|---|---|
| 6,244,510 B1* | 6/2001 | Ring et al. ............... 235/462.43 |
| 6,542,079 B1* | 4/2003 | Kahl, Sr. .................... 340/568.5 |
| 6,741,177 B2* | 5/2004 | Ballantyne ................. 340/568.5 |
| 6,889,118 B2 | 5/2005 | Murray, IV et al. |
| 7,015,831 B2 | 3/2006 | Karlsson et al. |
| 7,076,336 B2 | 7/2006 | Murray, IV et al. |
| 7,100,824 B2 | 9/2006 | Ostrowski et al. |
| 7,135,992 B2 | 11/2006 | Karisson et al. |
| 7,162,056 B2 | 1/2007 | Burl et al. |
| 7,162,338 B2 | 1/2007 | Goncalves et al. |
| 7,177,737 B2 | 2/2007 | Karlsson et al. |
| 7,219,838 B2 | 5/2007 | Brewster et al. |
| 7,242,300 B1 | 7/2007 | Konstad et al. |
| 7,246,745 B2* | 7/2007 | Hudnut et al. ................ 235/383 |
| 7,272,467 B2 | 9/2007 | Goncalves et al. |
| 7,283,983 B2 | 10/2007 | Dooley et al. |
| 7,337,960 B2 | 3/2008 | Ostrowski et al. |
| 7,443,295 B2 | 10/2008 | Brice et al. |
| 7,535,071 B2 | 5/2009 | Schell et al. |
| 7,573,403 B2 | 8/2009 | Goncalves et al. |
| 7,631,808 B2 | 12/2009 | Kundu et al. |
| 7,639,142 B2* | 12/2009 | Roeder et al. ............. 340/572.4 |
| 7,646,887 B2 | 1/2010 | Goncalves et al. |
| 7,660,447 B2* | 2/2010 | Fujii ............................ 382/124 |
| 7,660,747 B2 | 2/2010 | Brice et al. |
| 7,679,532 B2 | 3/2010 | Karlsson et al. |
| 7,714,723 B2 | 5/2010 | Fowler et al. |
| 7,720,554 B2 | 5/2010 | DiBernardo et al. |
| 7,762,458 B2 | 7/2010 | Stawar et al. |
| 7,774,158 B2 | 8/2010 | Goncalves et al. |
| D625,059 S | 10/2010 | Morenstein et al. |
| D625,060 S | 10/2010 | Morenstein et al. |
| D625,062 S | 10/2010 | Morenstein et al. |
| D625,477 S | 10/2010 | Morenstein et al. |
| 7,823,787 B2 | 11/2010 | He et al. |
| D629,827 S | 12/2010 | Morenstein et al. |
| 7,868,759 B2* | 1/2011 | Zimmerman .............. 340/568.5 |
| 7,883,012 B2* | 2/2011 | Tabet et al. .................... 235/383 |
| 7,903,838 B2 | 3/2011 | Hudnut et al. |
| 7,909,248 B1 | 3/2011 | Goncalves |
| 7,920,062 B1 | 4/2011 | Konstad et al. |
| 7,925,381 B2 | 4/2011 | Murray, IV et al. |
| 7,996,097 B2 | 8/2011 | Dibernardo et al. |
| 8,068,674 B2 | 11/2011 | Goncalves |
| 8,095,336 B2 | 1/2012 | Goncalves et al. |
| 8,145,531 B1 | 3/2012 | Ptak et al. |
| 8,267,316 B2* | 9/2012 | Ostrowski et al. ............. 235/383 |
| 2001/0030237 A1* | 10/2001 | Courtney et al. ........... 235/462.4 |
| 2001/0032884 A1* | 10/2001 | Ring et al. .................... 235/454 |
| 2002/0121547 A1* | 9/2002 | Wieth et al. .................... 235/383 |
| 2002/0145037 A1* | 10/2002 | Goodwin, III ................ 235/383 |
| 2003/0115096 A1* | 6/2003 | Reynolds et al. ............... 705/14 |
| 2003/0132292 A1* | 7/2003 | Gomez et al. ................. 235/383 |
| 2003/0184440 A1* | 10/2003 | Ballantyne ................. 340/568.5 |
| 2005/0182518 A1 | 8/2005 | Karlsson |
| 2005/0189412 A1* | 9/2005 | Hudnut et al. ................ 235/383 |
| 2005/0211880 A1 | 9/2005 | Schell et al. |
| 2005/0213109 A1 | 9/2005 | Schell et al. |
| 2005/0234679 A1 | 10/2005 | Karlsson |
| 2006/0008127 A1* | 1/2006 | Sellers ........................... 382/124 |
| 2006/0032914 A1* | 2/2006 | Brewster et al. ............... 235/383 |
| 2006/0032925 A1* | 2/2006 | Acosta ..................... 235/462.36 |
| 2006/0147087 A1* | 7/2006 | Goncalves et al. ........... 382/103 |
| 2006/0208083 A1* | 9/2006 | Kotlarsky et al. ........ 235/462.01 |
| 2006/0244588 A1* | 11/2006 | Hannah et al. ........... 340/539.13 |
| 2006/0261157 A1* | 11/2006 | Ostrowski et al. ............. 235/383 |
| 2006/0283943 A1 | 12/2006 | Ostrowski et al. |
| 2006/0289637 A1 | 12/2006 | Brice et al. |
| 2006/0290494 A1* | 12/2006 | O'Brien ...................... 340/568.5 |
| 2006/0293968 A1 | 12/2006 | Brice et al. |
| 2007/0029389 A1 | 2/2007 | Good et al. |
| 2007/0040024 A1* | 2/2007 | Murofushi et al. ........... 235/383 |
| 2007/0057049 A9 | 3/2007 | Kundu et al. |
| 2007/0084918 A1* | 4/2007 | Tabet et al. .................... 235/383 |
| 2007/0090973 A1 | 4/2007 | Karlsson et al. |
| 2007/0235531 A1* | 10/2007 | Addison et al. ................ 235/383 |
| 2007/0262884 A1 | 11/2007 | Goncalves et al. |
| 2008/0029603 A1* | 2/2008 | Harris ....................... 235/462.31 |
| 2008/0041957 A1 | 2/2008 | Kotlarsky et al. |
| 2008/0071423 A1 | 3/2008 | Murray, IV et al. |
| 2008/0078839 A1* | 4/2008 | Barkan ........................... 235/470 |
| 2008/0116281 A1* | 5/2008 | Barkan ....................... 235/472.01 |
| 2008/0215443 A1* | 9/2008 | Dooley et al. ................... 705/14 |
| 2008/0230603 A1* | 9/2008 | Stawar et al. .................. 235/383 |
| 2008/0231228 A1 | 9/2008 | Fowler et al. |
| 2008/0231431 A1 | 9/2008 | Stawar et al. |
| 2008/0231432 A1 | 9/2008 | Stawar et al. |
| 2008/0231448 A1 | 9/2008 | Fowler et al. |
| 2008/0237339 A1 | 10/2008 | Stawar et al. |
| 2008/0238009 A1 | 10/2008 | Carpenter |
| 2008/0238615 A1 | 10/2008 | Carpenter |
| 2008/0243626 A1 | 10/2008 | Stawar et al. |
| 2009/0020611 A1* | 1/2009 | Sackett et al. ............ 235/462.08 |
| 2009/0081923 A1 | 3/2009 | Dooley et al. |
| 2009/0082879 A1 | 3/2009 | Dooley et al. |
| 2009/0281661 A1 | 11/2009 | Dooley et al. |
| 2010/0022785 A1 | 1/2010 | Hechler et al. |
| 2010/0166324 A1 | 7/2010 | Kundu et al. |
| 2010/0230934 A1 | 9/2010 | Fine |
| 2010/0268697 A1 | 10/2010 | Karlsson et al. |
| 2010/0280754 A1 | 11/2010 | Goncalves et al. |
| 2010/0286905 A1 | 11/2010 | Goncalves et al. |
| 2011/0057035 A1* | 3/2011 | Matsuhisa et al. ............ 235/383 |
| 2011/0125323 A1 | 5/2011 | Gutmann et al. |
| 2011/0162157 A1 | 7/2011 | Dooley et al. |
| 2011/0166707 A1 | 7/2011 | Romanov et al. |
| 2011/0167574 A1 | 7/2011 | Stout et al. |
| 2011/0215147 A1 | 9/2011 | Goncalves |
| 2012/0041592 A1 | 2/2012 | Murray, IV et al. |
| 2012/0085824 A1* | 4/2012 | Handshaw et al. ....... 235/462.31 |
| 2013/0048732 A1* | 2/2013 | Gregerson et al. ........ 235/462.14 |

OTHER PUBLICATIONS

US 7,819,314, 10/2010, Ostrowski et al. (withdrawn)

\* cited by examiner

SCANNER WITH WAKE-UP MODE

FIELD OF THE INVENTION

The present invention relates to indicia reading devices, and more particularly to an indicia reader with improved wake-up mode.

An exemplary information reading device for reading information bearing devices (IBDs) or information data carriers (IDC) that have data encoded or provided therein. An IDC may provide data from a number of sources, such as "flash" type memory, (e.g. a memory device sometimes known as "Multimedia MMC," "Smart Media," "Compact Flash," and "Memory Stick.", memory stick or drive; a command entered from the point of transaction system; a command from the local host or server; a magnetic stripe; a RFID device; wireless transmission device such as a BLUETOOTH™, a biometric from a person, etc. An exemplary reader may be an indicia bearing information (IBI) reader (also referred to as scanners, laser scanners, bi-optic reader, indicia readers, etc.) that reads data represented by printed or displayed IBI, (also referred to as symbols, symbology, bar codes, etc.) For instance one type of a symbol is an array of rectangular bars and spaces that are arranged in a specific way to represent elements of data in machine readable form. Indicia reading devices typically transmit light onto a symbol and receive light scattered and/or reflected back from a bar code symbol or indicia. The received light is interpreted by a processor which performs signal and/or image processing to extract the data represented by the symbol. Indicia reading devices typically utilize visible or infrared light. Laser indicia reading devices typically utilize transmitted laser light.

Exemplary readers used in a high-throughput point of transaction (POT) application typically falls into a category of scanners or indicia readers known as bi-optic scanners.

Efforts regarding such systems have led to continuing developments to improve their versatility, practicality and efficiency.

DETAILED DESCRIPTION

Figure 1:
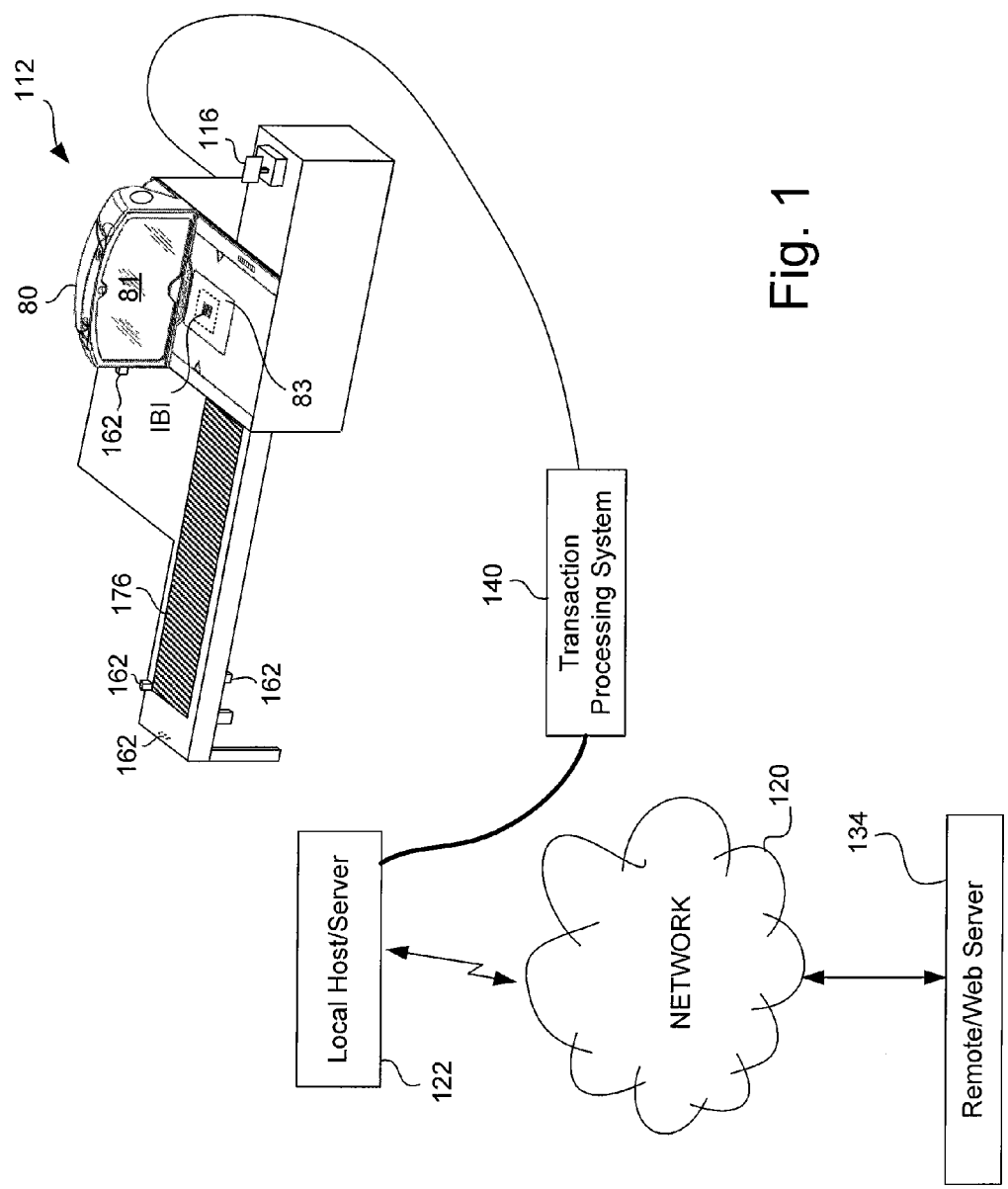
FIG. 1 is a block diagram of an exemplary indicia reader system.
Figure 2:
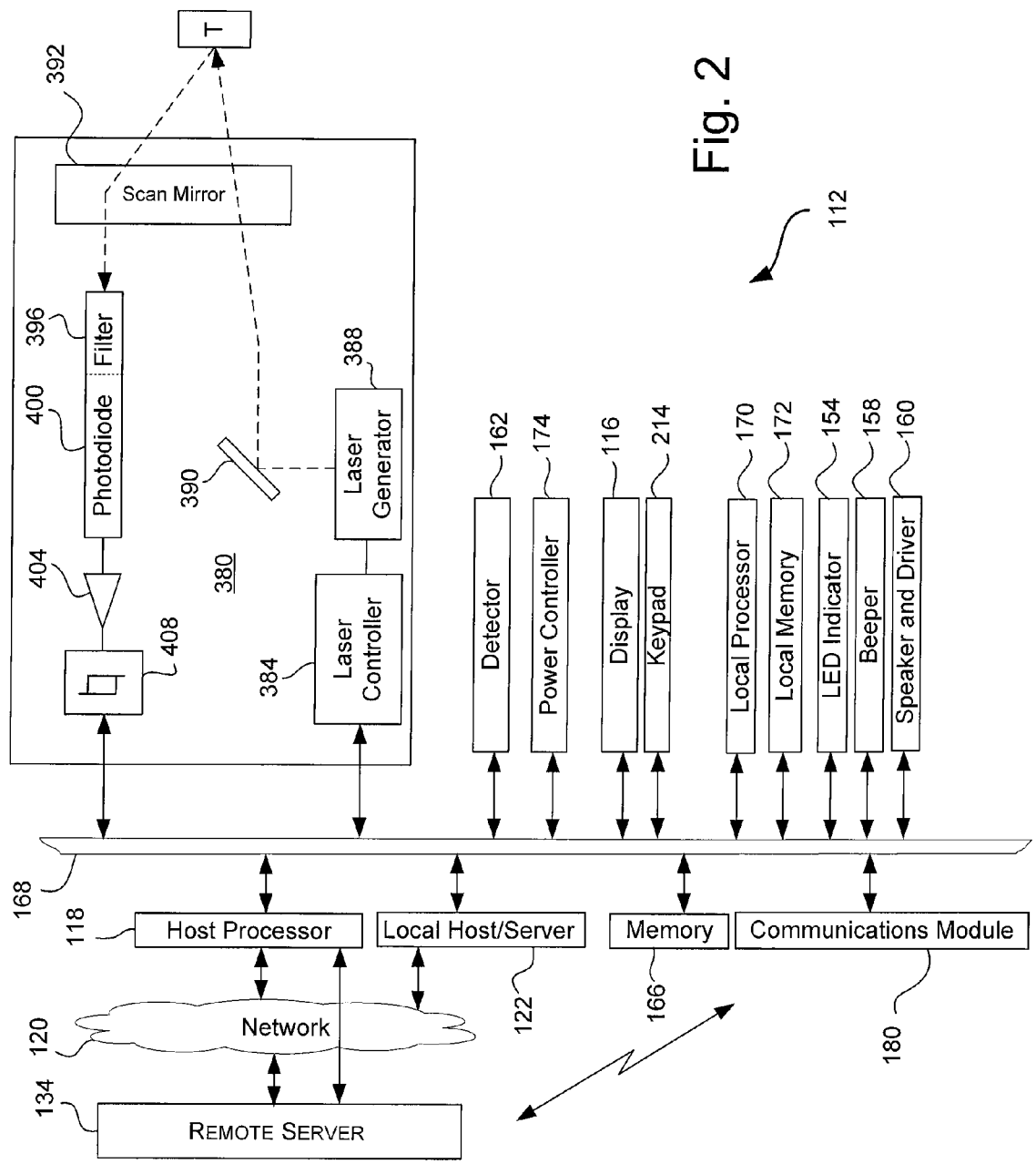
FIG. 2 is a simplified schematic block diagram of an exemplary indicia reader system.

Reference will now be made to exemplary embodiments which are illustrated in the accompanying drawings. Other embodiments may be in various forms and the exemplary embodiments should not be construed as limited to the embodiments set forth herein. Rather, these representative embodiments are described in detail so that this disclosure will be thorough and complete, and will fully convey the scope, structure, operation, functionality, and potential applicability to those skilled in the art. Wherever possible, the same reference numbers will be used throughout the drawings to refer to the same or like parts. The term "scan" or "scanning" used herein refers to reading or extracting data from an information bearing indicia (or symbol). The term imaging used herein refers to the taking or creation of an electronic image.

Referring to the figures, an exemplary reader system configuration comprises an indicia reader 112 operated by an establishment operator or cashier and utilized where information bearing indicia (IBI) are present. The indicia reader may be stationary and may be either laser indicia reading devices (or bi-optic or laser scanners) utilizing transmitted laser light for extracting data from IBIs.

An operator may pass a target containing an IBI, dataform, text, or other data to be collected passed the indicia reading device. An IBI or dataform may be an originally machine generated symbology that is also machine readable, such as a 1-D barcode, a 2-D barcode, a 1-D stacked barcode, a logo, glyphs, color-codes, and the like.

Exemplary indicia readers may be in communication (wired or wireless) to a local transaction processing system 140, such as a cash register, customer station or employee station or local host/server 122 directly or through a charging station or base 138. An exemplary local server 122 or indicia reader 112 may be in communication with network 120 and or a remote/web server 134.

An exemplary indicia reader 112 may be used in an establishment such as a store at a point of transaction. An exemplary indicia reader may be of a bi-optic laser scanning system which includes a centrally-positioned double-sided rotating mirror or central spinner, a first and second deflector or directional mirror, a first and second wobbling mirror, and a plurality of pattern mirrors. The scanning system may be mounted in stationary or fixed housings 80, wherein patterns mirrors may be positioned and aligned to direct the two scanning patterns in different directions towards a common scanning field. Exemplary stationary or fixed-mount retail scanners may combine both vertical and horizontal laser output windows 81, 83 respectively that view a single common scanning field or region for reading IBI targets on products that may be located on the bottom or sides of the products.

An exemplary use of the exemplary indicia reader is as the primary or sole scanner at a customer point of transaction (POT) in an establishment. Primary may mean the scanner at a POT is used to scan or image items more often than any other scanner or imager at the POT. A transaction may be any of a number of events that occur between a customer and an establishment, such as a store. The events may involve such things as exchange of monetary funds, payment for merchandise or service, return of merchandise, picking up merchandise that has already been paid for, or contracting for a service (such as leasing or renting).

As the primary scanner, merchandise with indicia can be read by it so that data decoded therefrom may be used for a stock keeping system (such as SKU) functionality such as sales, price look up, inventory, etc.

Exemplary indicia reader may be in communication (wired or wireless) to a local transaction processing system 140, such as a cash register, customer station or employee station or local host/server 122 directly or through a charging station or base 138. An exemplary local server 122 or indicia reader 112 may be in communication with network 120 and or a remote/web server 134.

An exemplary indicia reader 112 may comprise a number of exemplary subsystems, such as laser scan engine 380 or laser scanning reader system for reading indicia on a target T. The laser scanning reader system may comprise a laser controller 384 for controlling a laser generator 388 for generating a laser light beam which may be directed onto a folding mirror 390 which then directs the laser light beam to an oscillating or rotating scan mirror 392 to project a scanning pattern onto target T. The laser scanning pattern may be reflected off of the target and redirected by scan mirror 392 into a receive path comprising a laser light pass filter 396, a photodiode 400, an amplifier 404 and a digitizer 408.

Exemplary laser scanners use a laser beam as the light source and employ either a reciprocating mirror or a rotating prism to scan the laser beam back and forth across the IBI. One or more photodiodes are used to measure the intensity of the light reflected back from the bar code. The light emitted by the reader is rapidly varied in brightness with a data pattern and the photodiode receive circuit is designed to detect only signals with the same modulated pattern.

An exemplary photodetector or photosensor may be comprised of one or more photodiodes that converts incident light energy into electric charge that is an output signal representative of light reflected off an IBI. The output of the photodetector may be processed utilizing one or more functions or algorithms to condition the signal appropriately for use in further processing downstream.

An exemplary image sensor converts light or other electromagnetic energy reflected off of a target and provides an output signal representative thereof. Image sensors may be an array of pixels adapted to operate in a global shutter or full frame shutter, mode or alternately operate in a rolling shutter mode. It may be a color or monochrome 2D solid state image sensor implemented in any of CCD, CMOS, NMOS, PMOS, CID, CMD, back-illuminated technologies. The imager may be either a progressive or interleaved imager. The image sensor may contain an array of light sensitive photodiodes (or pixels) that convert incident light energy into electric charge. Many solid state image sensors also allow regions of a full frame of image data to be addressed.

An exemplary photo detector or image sensor may use a monocolor image sensor that may include a filter element defining color sensitive pixel elements dispersed throughout an array of monochrome pixels. Operation of the monocolor image sensor is to subsample color images (monochrome or full color) utilizing associated optimal sensor settings for image capture or symbology scanning. Exemplary monocolor image sensors are described in U.S. Patent Publication Number 20060274171 entitled DIGITAL PICTURE TAKING OPTICAL READER HAVING HYBRID MONOCHROME AND COLOR IMAGE SENSOR ARRAY the entirety of which is hereby incorporated herein by reference.

Laser light may be described as a spatially coherent, narrow low-divergence beam of light. The output signal of the photodetector may be processed utilizing one or more functions or algorithms to condition the signal appropriately for use in further processing downstream, including decoding of IBIs.

Other exemplary subsystems or components for the scanner system may include one or more processor(s) or controllers 170, local memory 172, a display 116, a key pad 214, a communications module 180, a beeper 158 for providing audio feedback or a speaker and speaker driver 160 for providing audio feedback, one or more detectors 162 and a power controller 174. The subsystems may communicate via one or more bus 168, data lines or other signal or data communication form. The scanner may communicate with one or more host processor(s) 118, a local host/server 122, local memory 166, network 120 or remote server host/server 134 utilizing a communications module 180.

Exemplary detectors may be proximity detectors to detect the presence of a person or item, imagers for taking images of events or persons, motion detectors, audio detectors for detecting audio signals such as voice messages, etc.

The particulars of the functionality of the processor(s) and the reader may be determined by or based upon certain configuration settings or data which may be stored in firmware, remote or local memory.

An exemplary processor may be a mixed-signal array with on-chip controller devices designed to replace multiple traditional MCU-based system components with one single-chip programmable device. It may include configurable blocks of analog and digital logic, as well as programmable interconnects.

Exemplary functions of the processor(s) may be controlling operation of the scan engine, decoding functions and operator interface functions. Operating software may be utilized to operate the processor(s) for such functions seemingly simultaneously or in a multitasking role. An exemplary image reader operating software architecture may be organized into processes or threads of execution.

Processor(s), memory and associated circuitry which perform or control the exemplary scan and decoding functions may be provided in the scan engine or on associated circuit boards which are located within the housing of the reader. Decoding is a term used to describe the interpretation of a machine readable code.

The motors on a bi-optic scanner can take seconds to reach designed scanning speed when the scanner comes out of a sleep mode. This time is wasted if the cashier or operator has to wait to start scanning.

Bi-optic scanners may have a controller programmed to go into a power save or sleep mode by interrupting or turning off power to the lasers and motors to conserve energy. Once asleep, it is important to for the motors on a bi-optic scanner to reach designed scanning speed when the scanner comes out of a sleep mode (to wake up). Operator or cashier interaction with the scanner is currently the method to wake up the scanner utilizing infrared (IR) detection, photo detection, switch depression or host commands.

Sometimes however, a customer arrives at the scanner prior to the cashier. Providing a method to detect the presence of a customer and trigger the scanner to wake up, it gives the scanner additional time to reach full motor speed so it is ready to scan by the time the cashier arrives. One or more detectors 162 may be utilized to detect the presence of a customer.

An exemplary system for detecting the presence of a customer may be detecting vibration such as at the start of a conveyor belt 176 using a vibration detector disposed on the scanner to provide a signal to a controller to wake-up the scanner. The conveyor belt for moves items towards the scanner.

In an exemplary embodiment, a conveyor may be a separate piece from the scanner housing in which case the vibration detector may be disposed on the conveyor to provide a signal to a controller to wake-up the scanner.

In an exemplary embodiment, the detector may detect the placement of items on the belt itself by sensing weight or vertical pressure or movement of items placed onto the belt or platform or motion of the conveyor belt to provide a signal to a controller to wake-up the scanner.

In an exemplary embodiment, the conveyor is grounded because it is a voltage generator while moving. A voltage detector may detect high voltage generated on the belt before it reaches grounded potential and provide a indication signal to a controller to wake-up the scanner.

In an exemplary embodiment, a photo or IR detector may be disposed on the customer's side (or rear) of the scanner, or it may be disposed under the conveyor to the entrance of the checkout lane.

In an exemplary embodiment, a photo or IR detector may be disposed on the side of the scanner facing the conveyor belt and may detect items placed on the conveyor and/or customer motion.

In an exemplary embodiment the photo detector may also be used to sense or image items on the bottom of a shopping cart in order to prevent an operator from missing scanning items stored there. The image may be displayed for the operator to see or an indication signal may alert the operator of the existence of items on the bottom of the cart.

Figure 3:
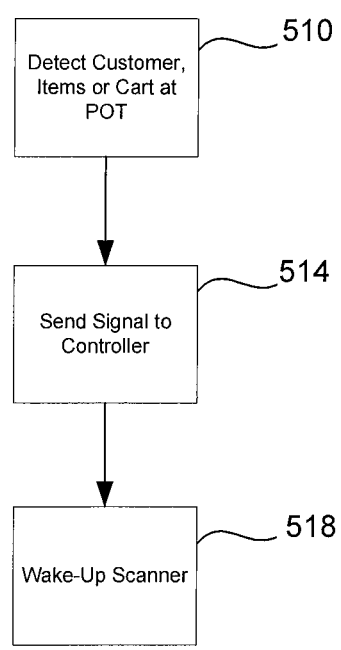
FIG. 3 is an exemplary flowchart for operating an indicia reader system.

A flowchart of an exemplary of operating a scanning system is illustrated in FIG. 3, wherein a customer, item or cart is detected in a step 510. Upon detection, a signal is sent to a controller in a step 514 to wake-up the scanner in a step 518.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The illustrated embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The invention claimed is:

1. A system comprising:
    an indicia reader provided at a point of transaction; a controller for controlling power to the indicia reader;
    a controller that interrupts power to the indicia reader during a power save mode and resumes power to the indicia reader upon receiving an indication signal;
    a first detector for detecting a customer, item or shopping cart at the point of transaction and for providing the indication signal to the controller on the presence of a customer, item or shopping cart at the point of transaction being detected using the first detector;
    a second detector comprising a photo detector for sensing items disposed on the bottom of a shopping cart and for providing the indication signal to the controller on the presence of a shopping cart at the point of transaction being detected using the second detector, wherein the first detector is disposed at the indicia reader and wherein the second detector is disposed at a location spaced apart from the indicia reader.

2. A system according to claim 1, wherein the first detector comprises a photo detector disposed on a side of the scanner facing the customer.

3. A system according to claim 1, wherein the photo detector of the second detector is disposed at the entrance of a point of transaction checkout lane.

4. A method of operating a system comprising the steps of:
    providing an indicia reader at a point of transaction;
    controlling power to the indicia reader during a power save mode to interrupt power to the indicia reader;
    detecting a customer, item or shopping cart at the point of transaction and providing an indication signal to the controller of the presence of the customer, item or shopping cart at the point of transaction;
    resuming power to the indicia reader upon the controller receiving the indication signal;
    wherein the detecting comprises using a first detector and a second detector, the first detector for detecting a customer, item or shopping cart at the point of transaction and for providing the indication signal to the controller on the presence of a customer, item or shopping cart at the point of transaction being detected using the first detector, the second detector comprising a photo detector for sensing items disposed on the bottom of a shopping cart and for providing the indication signal to the controller on the presence of a shopping cart at the point of transaction being detected using the second detector, wherein the first detector is disposed at the indicia reader and wherein the second detector is disposed at a location spaced apart from the indicia reader.

5. A method according to claim 4, wherein the first detector includes a photo detector disposed on a side of the indicia reader facing the customer.

6. A method according to claim 4, wherein the photo detector of the second detector is disposed at the entrance of a point of transaction checkout lane.

7. The system of claim 1, wherein the system further alerts an operator of the existence of an item on the bottom of the shopping cart.

8. The method of claim 4, wherein the method further comprises alerting an operator of the existence of an item on the bottom of the shopping cart.

9. The method of claim 4, wherein the method further comprises displaying an image of an item on the bottom of the shopping cart.

* * * * *